US011178331B2

(12) United States Patent
Kim et al.

(10) Patent No.: US 11,178,331 B2
(45) Date of Patent: Nov. 16, 2021

(54) CAMERA MODULE ACTUATOR MOVEMENT SENSING ELEMENT AND CAMERA MODULE FLEXIBLE CIRCUIT BOARD INCLUDING SAME

(71) Applicant: Dongwoon Anatech Co., Ltd., Seoul (KR)

(72) Inventors: Ju Seong Kim, Seoul (KR); Jung Ho Jin, Seoul (KR)

(73) Assignee: Dongwoon Anatech Co., Ltd., Seoul (KR)

( * ) Notice: Subject to any disclaimer, the term of this patent is extended or adjusted under 35 U.S.C. 154(b) by 61 days.

(21) Appl. No.: 16/613,249

(22) PCT Filed: May 14, 2018

(86) PCT No.: PCT/KR2018/005466
§ 371 (c)(1),
(2) Date: Nov. 13, 2019

(87) PCT Pub. No.: WO2018/212516
PCT Pub. Date: Nov. 22, 2018

(65) Prior Publication Data
US 2020/0177815 A1 Jun. 4, 2020

(30) Foreign Application Priority Data
May 19, 2017 (KR) .......................... 10-2017-0062282

(51) Int. Cl.
*H04N 5/232* (2006.01)
*G03B 5/00* (2021.01)

(52) U.S. Cl.
CPC ........... *H04N 5/23287* (2013.01); *G03B 5/00* (2013.01); *H04N 5/23274* (2013.01)

(58) Field of Classification Search
CPC .... H04N 5/2328; H04N 5/23287; G03B 5/00; G02B 27/646
See application file for complete search history.

(56) References Cited

U.S. PATENT DOCUMENTS 9,470,554 B2 10/2016 Kubota et al.
10,382,687 B1 * 8/2019 Patel .................... G02B 27/64
(Continued)

FOREIGN PATENT DOCUMENTS

CN 104614916 A 5/2015
CN 205179196 U 4/2016
(Continued)

OTHER PUBLICATIONS

International Search Report PCT/ISA/210 for International Application No. PCT/KR2018/005466 dated Sep. 6, 2018.
(Continued)

*Primary Examiner* — Noam Reisner
(74) *Attorney, Agent, or Firm* — Harness, Dickey & Pierce, P.L.C.

(57) ABSTRACT

The present invention relates to a camera module actuator movement sensing element required for camera shake correction, and a camera module flexible circuit board including the same. On the camera module flexible circuit board, there are mounted: a plurality of actuator movement sensing elements for sensing each of the movement distances of an actuator in the x-axis and y-axis directions perpendicular to the optical-axis (z-axis) direction of the actuator to which a lens assembly is coupled, and transmitting the same by a method using a two-wire interface; and an OIS controller IC for performing camera shake correction by receiving, from the plurality of actuator movement sensing elements, a feedback of the movement distances of the actuator by the method using a two-wire interface, wherein: the plurality of actuator movement sensing elements share a common serial (Continued)

data pin and a common serial clock pin with each other, and the common serial data pine and the common serial clock pin are connected to a serial data pin and a serial clock pin of the OIS controller IC, respectively; and the plurality of actuator movement sensing elements share a common power pin and a common ground pin with each other, or share only a common power pin or a common ground pin with each other.

8 Claims, 4 Drawing Sheets

(56) References Cited

U.S. PATENT DOCUMENTS

| | | | | |
|---|---|---|---|---|
| 2006/0232262 | A1* | 10/2006 | Tanizawa | G01R 15/183 |
| | | | | 324/117 H |
| 2011/0176015 | A1 | 7/2011 | Yun | |
| 2018/0205887 | A1* | 7/2018 | Ishikawa | G03B 5/00 |

FOREIGN PATENT DOCUMENTS

| | | |
|---|---|---|
| JP | 06-197305 A | 7/1994 |
| JP | 2002-320134 A | 10/2002 |
| JP | 2006-047054 A | 2/2006 |
| JP | 2010-191210 A | 9/2010 |
| JP | 2012-003022 A | 1/2012 |
| JP | 2014-032154 A | 2/2014 |
| JP | 5680260 B1 | 3/2015 |
| JP | 2015-513091 A | 4/2015 |
| JP | 2015-179887 A | 10/2015 |
| KR | 10-2011-0085141 A | 7/2011 |
| KR | 10-2014-0036696 A | 3/2014 |
| KR | 10-2014-0140572 A | 12/2014 |
| KR | 10-2016-0095911 A | 8/2016 |
| KR | 10-2017-0054608 A | 5/2017 |
| WO | WO-2016/003103 A1 | 1/2016 |
| WO | WO-2016/151925 A1 | 9/2016 |

OTHER PUBLICATIONS

Chinese Office Action dated Sep. 25, 2020 issued in corresponding Chinese Patent Application No. 201880032741.4. English translation has been provided.

Japanese Office Action dated Oct. 20, 2020 issued in corresponding Japanese Patent Application No. 2019-563757. English translation has been provided.

Japanese Office Action dated Apr. 6, 2021 issued in corresponding Japanese Patent Application No. 2019-563757.

* cited by examiner

CAMERA MODULE ACTUATOR MOVEMENT SENSING ELEMENT AND CAMERA MODULE FLEXIBLE CIRCUIT BOARD INCLUDING SAME

CROSS-REFERENCE TO RELATED APPLICATIONS

This application is a national phase under 35 U.S.C. § 371 of PCT International Application No. PCT/KR2018/005466 which has an International filing date of May 14, 2018, which claims priority to Korean Patent Application No. 10-2017-0062282, filed May 19, 2017, the entire contents of each of which are hereby incorporated by reference.

TECHNICAL FIELD

This invention relates to a camera shake correction, and more particularly, to a camera module actuator movement sensing element required for camera shake correction and a camera module flexible circuit board including the same.

BACKGROUND ART

In portable communication devices equipped with camera modules, as the fluidity and portability increase, there occurs a phenomenon in which images are disturbed due to minute vibrations or shakes generated by a human body. As measures for obtaining clear images, camera modules equipped with shake correction devices (or technologies) have become common. The shake correction devices (technologies) are classified into digital image stabilization (DIS) methods, electronic image stabilization (EIS) methods, and optical image stabilization (OIS) methods. In terms of performance, the OIS methods are widely used.

In a shake correction device using an OIS method, a Hall sensor is basically used to receive feedback of a movement distance of an actuator (or a carrier in a narrow sense). That is, it can be regarded that Hall sensors on X and Y axes, and an analog front end (AFE) and a shake corrector (an OIS controller), which are configured to pre-process signals output from the Hall sensors, constitute the shake correction device. The AFE and the shake corrector (the OIS controller) are included in a single integrated circuit (IC) chip (which is also referred to as an OIS controller IC). As described above, as shown in FIG. 1, when the AFE and the shake corrector (the OIS controller) are included in one IC chip, in order to connect Hall sensors 10 and 20 to an OIS controller IC 30, seven pins for VHX, XH+, XH−, VHY, YH+, YH−, and a common GND are required. As shown in FIG. 2, in order to drive an actuator of a camera module, four driver connection pins P1 to P4 are required so that a total of eleven pins and lines for connecting the eleven pins should be formed in a flexible circuit board (FPCB). For reference, in FIGS. 2, A and B represent the Hall sensors on the X and Y axes, respectively.

When axes for controlling a camera module increases, the number of the Hall sensors increases accordingly, and the number of pins for connecting the increased number of the Hall sensors to a peripheral circuit also increases. Minimizing the number of output pins of the Hall sensors required to control the camera module and the number of driver connection pins for driving an actuator of the camera module may contribute to not only provide convenience in designing and manufacturing a FPCB which connects the camera module to the OIS controller IC, but also reduce a manufacturing cost. Therefore, a new method is urgently needed to minimize the number of physical pins for connecting the camera module to the OIS controller IC.

Meanwhile, shake correction performance and auto-focusing performance are affected by a temperature inside the camera module. A gain, i.e., sensitivity of a Hall sensor which senses a movement distance of the actuator in x- and y-axis directions perpendicular to an optical axis (a z-axis) direction of the actuator to which a lens assembly is coupled, is varied according to temperature variation so that a magnitude of an output voltage of the Hall sensor is also varied. Further, a magnet is used to detect the movement distance of the actuator using the Hall sensor. As the temperature inside the camera module varies, performance of the magnet also varies. Consequently, a system loop gain is varied such that OIS performance is degraded. In addition, in the case of the optical axis of the actuator, a lens is affected due to the temperature variation such that a problem occurs in that auto focusing is not performed normally.

Therefore, it is necessary to accurately sense the temperature inside the camera module. Since a part for sensing a temperature is usually located in the OIS controller IC instead of the camera module due to space constraints, an exact temperature inside the camera module cannot be known and thus there is a constraint in improving auto-focusing performance and shake correction performance.

RELATED ART DOCUMENT

Patent Document (Patent Document 1) Korean Patent Laid-Open Publication No. 10-2014-0036696

(Patent Document 2) Korean Patent Laid-Open Publication No. 10-2016-0095911

SUMMARY OF INVENTION

Technical Problem

The present invention is directed to providing a camera module actuator movement sensing element and a camera module flexible circuit board including the same, which are capable of providing convenience in designing and manufacturing a camera module as well as a flexible printed circuit board (FPCB) which connects the camera module to an optical image stabilization (OIS) controller integrated circuit (IC) by reducing the number of connection pins and the number of lines which connect the camera module to the OIS controller IC.

The present invention is also directed to providing a camera module actuator movement sensing element and a camera module flexible circuit board including the same, which are capable of accurately sensing and providing an internal temperature of a camera module so as to improve shake correction performance and auto-focusing performance.

The present invention is also directed to providing a camera module actuator movement sensing element which is capable of minimizing a configuration of the OIS controller IC for shake correction and miniaturizing a size thereof.

Solution to Problem

One aspect of the present invention provides a camera module actuator movement sensing element, which is a digital sensor which is usable by being connected to an optical image stabilization (OIS) controller integrated circuit (IC), including a Hall sensor configured to sense a movement distance of an actuator in an x-axis or y-axis direction perpendicular to an optical axis (z-axis) direction of the actuator to which a lens assembly is coupled;

a first signal preprocessor configured to amplify an actuator movement distance sensing signal which is output from the Hall sensor, remove noise, and convert into actuator movement distance sensing data in a digital form;

an interface configured to transmit the actuator movement distance sensing data to an optical image stabilization (OIS) controller, wherein the actuator movement distance sensing data is transmitted in a two-wire interface method.

As a variant embodiment, the camera module actuator movement sensing element may further include a temperature sensing sensor configured to sense an ambient temperature of the actuator;

a second signal preprocessor configured to amplify a temperature sensing signal output from the temperature sensing sensor and then remove noise; and a multiplexer configured to selectively output one of the actuator movement distance sensing signal from which noise is removed and the temperature sensing signal from which noise is removed to a digital conversion part of the first signal preprocessor according to a control period.

As another variant embodiment, the camera module actuator movement sensing element may further include an actuator driver configured to generate an actuator drive signal according to actuator drive control data transmitted from the OIS controller through the interface and output the actuator drive signal to the actuator.

Another aspect of the present invention provides a camera module flexible circuit board including a plurality of actuator movement sensing elements configured to sense movement distances of an actuator in x-axis and y-axis directions perpendicular to an optical axis (z-axis) direction of the actuator to which a lens assembly is coupled and transmit the sensed movement distances in a two-wire interface method; and an optical image stabilization (OIS) controller integrated circuit (IC) configured to correct hand shake by receiving feedback of the movement distances of the actuator from the plurality of actuator movement sensing elements in the two-wire interface method, wherein a serial data pin and a serial clock pin of each of the plurality of actuator movement sensing elements are shared to be connected to a serial data pin and a serial clock pin of the OIS controller IC, and a power pin and a ground pin of each of the plurality of actuator movement sensing elements are shared, or only either the power pin or the ground pin is shared.

As described above, each of the actuator movement sensing elements mounted on the camera module flexible circuit board may include a Hall sensor configured to sense the movement distance of the actuator the an x-axis or y-axis direction perpendicular to the optical axis (z-axis) direction of the actuator to which the lens assembly is coupled;

a first signal preprocessor configured to amplify an actuator movement distance sensing signal output from the Hall sensor, remove noise, and convert into actuator movement distance sensing data in a digital form; and an interface configured to transmit the actuator movement distance sensing data to the OIS controller IC in a two-wire interface method may further include a temperature sensing sensor configured to sense an ambient temperature of the actuator;

a second signal preprocessor configured to amplify a temperature sensing signal output from the temperature sensing sensor and remove noise; and a multiplexer configured to selectively output one of the actuator movement distance sensing signal from which noise is removed and the temperature sensing signal from which noise is removed to a digital conversion part of the first signal preprocessor according to a control period, and may further include an actuator driver configured to generate an actuator drive signal according to actuator drive control data transmitted from the OIS controller IC through the interface and output the actuator drive signal to the actuator.

Advantageous Effects of Invention

In accordance with the present invention, an actuator movement sensing element and a flexible printed circuit board according to the embodiments of the present invention include a Hall sensor configured to sense a movement distance of an actuator in an x-axis or y-axis direction perpendicular to an optical axis (z-axis) direction of the actuator to which a lens assembly is coupled, a first signal preprocessor configured to amplify an actuator movement distance sensing signal output from the Hall sensor, remove noise, and convert into actuator movement distance sensing data in a digital form, and an interface configured to transmit the actuator movement distance sensing data to an optical image stabilization (OIS) controller IC, wherein the actuator movement distance sensing data is transmitted in a two-wire interface method. Consequently, there is an effect of reducing the number of pins connecting the actuator movement sensing element to the OIS controller IC such that convenience in designing and manufacturing the FPCB as well as the camera module can be provided.

Further, since the actuator movement sensing element according to the embodiments of the present invention is provided in the camera module and includes a temperature sensing sensor, it is possible to accurately correct a variation in sensitivity of actuator movement sensing elements (such as x-axis and y-axis Hall sensors) or a variation in system loop gain due to a reduced magnetic flux density of a magnet, and a temperature of an interior of the camera module can be more accurately sensed such that there is an advantage in that auto-focusing performance in the optical axis (z axis) can be improved.

In addition, in the actuator movement sensing element according to the embodiments of the present invention, signal preprocessors for processing a signal sensed by the Hall sensor are IC-packaged together with the Hall sensor instead of an OIS controller so that there is an advantage in that a size of the OIS controller IC can be miniaturized by minimizing a configuration of the OIS controller IC for shake correction.

DETAILED DESCRIPTION OF EMBODIMENT

Hereinafter, exemplary embodiments of the present invention will be described in detail with reference to the accompanying drawings. In the following description of the present invention, when related known functions or configurations are determined to obscure the gist of the present invention, a detailed description thereof will be omitted herein.

Figure 3:
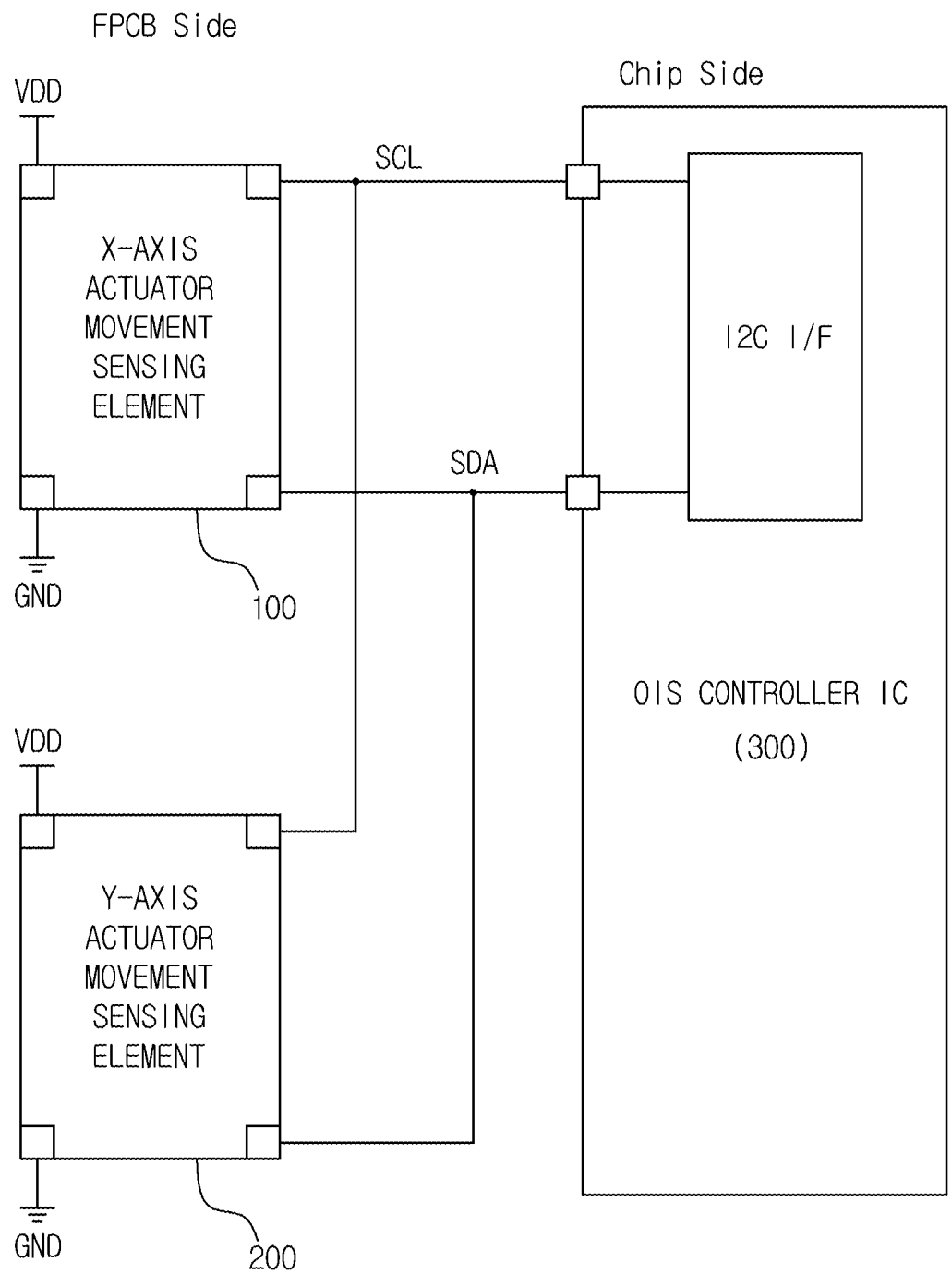
FIG. 3 is a schematic block diagram illustrating an example of a shake correction device mounted on a camera module flexible circuit board according to an embodiment of the present invention.
Figure 4:
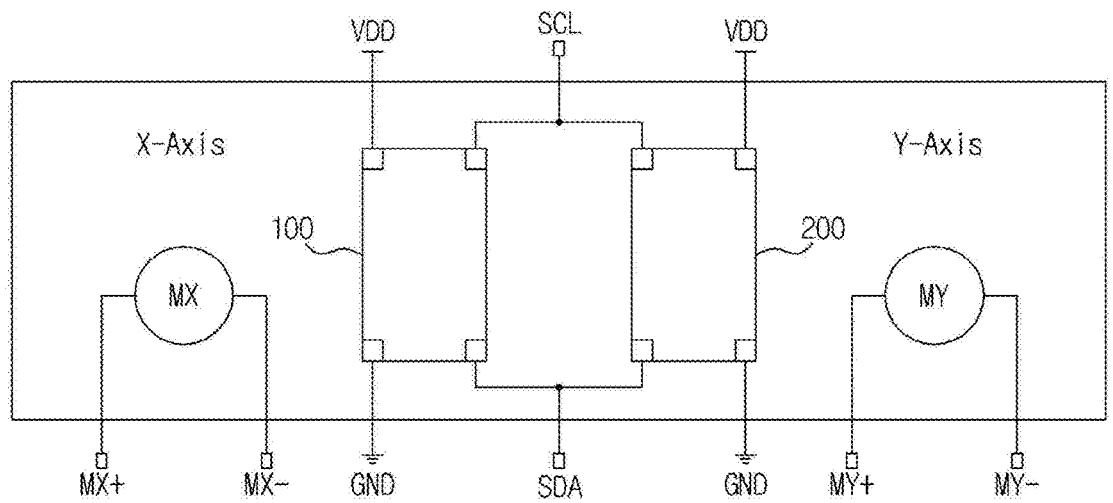
FIG. 4 is a diagram for describing a pin connection state of the camera module flexible circuit board according to the embodiment of the present invention.
Figure 5:
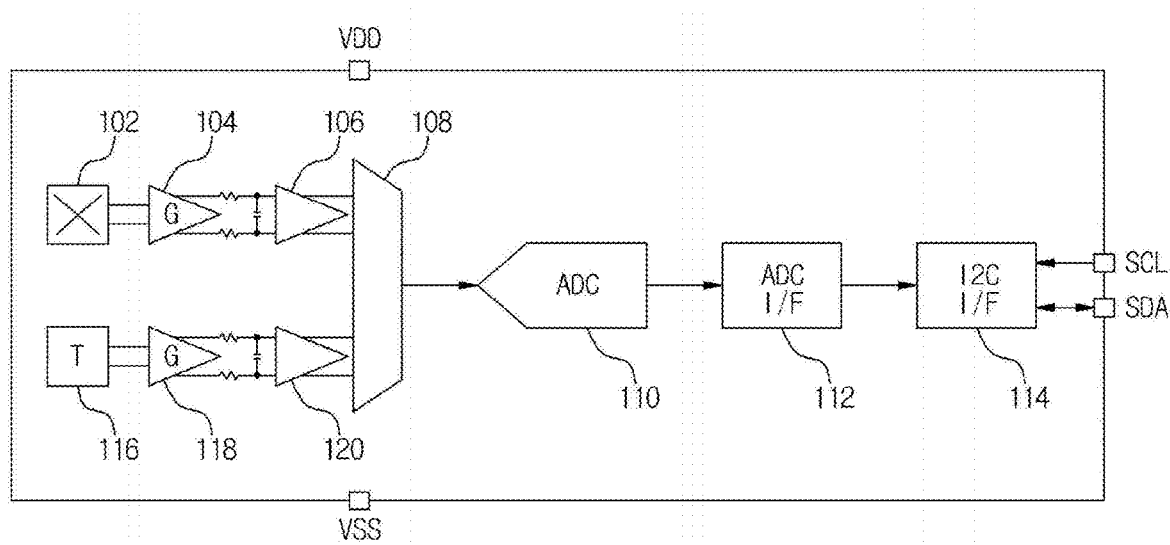
FIGS. 5 and 6 are detailed block diagrams illustrating an example of an actuator movement sensing element according to an embodiment of the present invention.
Figure 6:
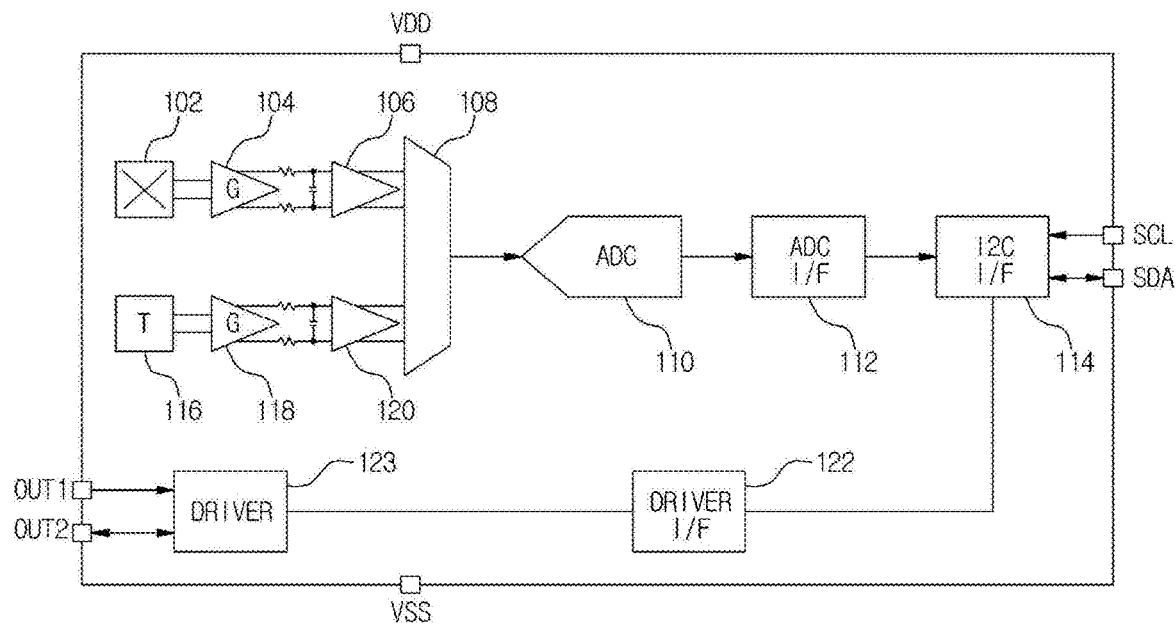

FIG. 3 is a schematic block diagram illustrating an example of a shake correction device mounted on a camera module flexible circuit board according to an embodiment of the present invention, FIG. 4 is a diagram for describing a pin connection state of the camera module flexible circuit board according to the embodiment of the present invention, and FIGS. 5 and 6 are detailed block diagrams illustrating an example of an actuator movement sensing element according to an embodiment of the present invention.

First, as shown in FIG. 3, the present invention is characterized in that, in the camera module FPCB according to the embodiment of the present invention, a plurality of actuator movement sensing elements 100 and 200 for sensing movement distances of an actuator in x-axis and y-axis directions perpendicular to an optical axis (z-axis) direction of the actuator to which a lens assembly is coupled and for transmitting the sensed movement distances to an optical image stabilization (OIS) controller integrated circuit (IC) 300 in a two-wire interface (SCL and SDA) method, and the OIS controller IC 300 for correcting shake by receiving feedback of the movement distances of the actuator from the plurality of actuator movement sensing elements 100 and 200 in the two-wire interface method are mounted on a camera module flexible circuit board (FPCB) according to the embodiment of the present invention, wherein the plurality of actuator movement sensing elements 100 and 200 share a serial data pin SDA and a serial clock pin SCL to be connected to the serial data and serial clock pins of the OIS controller IC 300, and a power pin VDD and a ground pin GND of each of the plurality of actuator movement sensing elements 100 and 200 are shared or only one of the power pin VDD and the ground pin GND is shared.

As described above, when the plurality of actuator movement sensing elements 100 and 200 constituting the camera module and the OIS controller IC 300 transmit and receive data through the two-wire interface method, the number of physical pins and the number of lines connecting the camera module to the OIS controller IC 300 are minimized so that advantages of convenience in designing and manufacturing the FPCB may be obtained.

To further elaborate on the above description with reference to FIG. 4, FIG. 4 is a diagram for describing a pin connection state of the camera module FPCB according to the embodiment of the present invention that illustrates a circuit diagram of a pin connection state of the camera module including the plurality of actuator movement sensing elements 100 and 200 and actuator driving coils MX and MY.

Referring to FIG. 4, the actuator movement sensing elements 100 and 200 for sensing movement distances of the actuator in the x-axis and y-axis directions and the actuator driving coils MX and MY are included in the camera module to which the actuator movement sensing elements 100 and 200 for a camera module according to the embodiment of the present invention.

Figure 1:
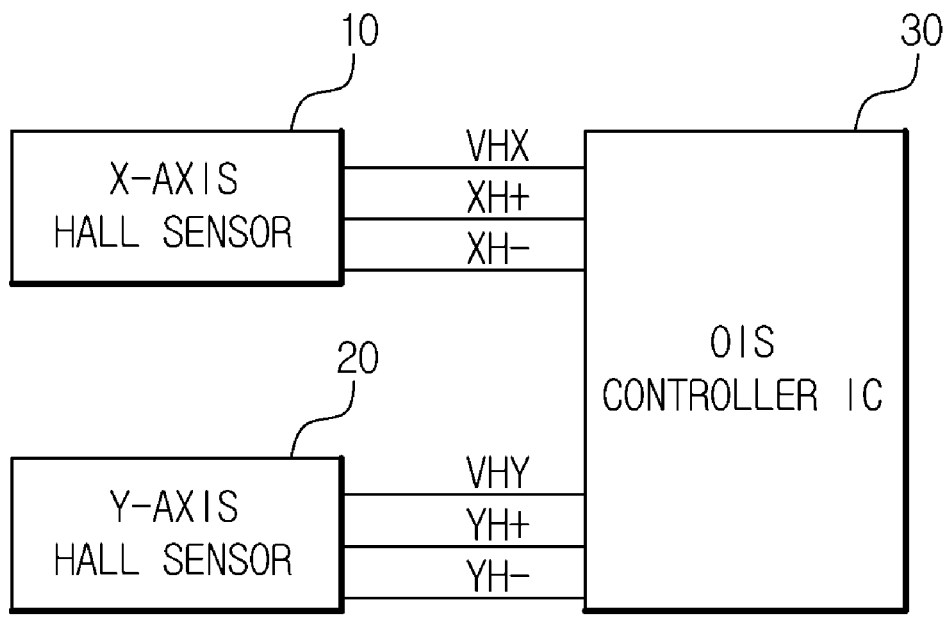
FIG. 1 is a schematic block diagram illustrating a general shake correction device.
Figure 2:
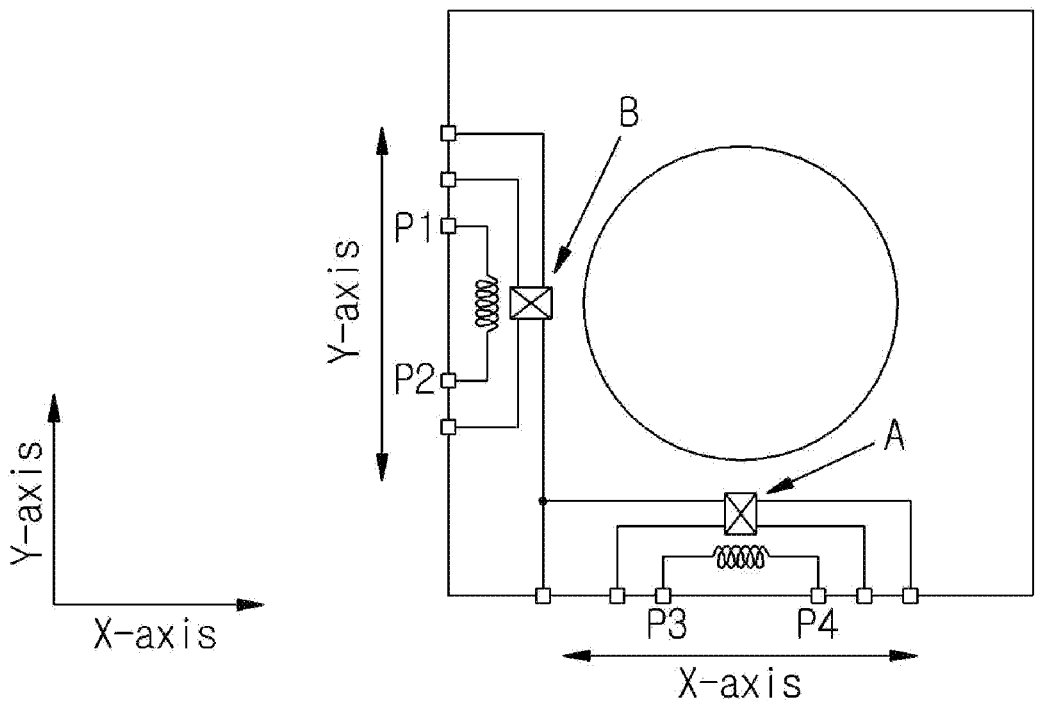
FIG. 2 is an exemplary diagram illustrating a circuit connection of a general camera module.

Thus, a total of eight pins, which include four pins MX+, MX−, MY+, and MY− required to drive the actuator driving coils MX and MY, two two-wire interface pins SCL and SDA for data interfacing with the OIS controller IC 300, one common power supply pin VDD, and one common ground pin GND, are required. When compared to the number of pins connecting the conventional camera module to the OIS controller IC which are described in FIG. 1, three pins may be omitted such that the number of pins may be reduced when the camera module is manufactured. Consequently, convenience in designing and manufacturing the FPCB may be provided.

Hereinafter, the actuator movement sensing elements 100 and 200 for a camera module, which are accommodated in the camera module, will be further described with reference to FIG. 5.

As shown in FIG. 5, each of the actuator movement sensing elements 100 and 200 for a camera module according to the embodiment of the present invention, which is implementable with a digital sensor, includes a Hall sensor 102 for sensing a movement distance of the actuator in the x-axis or y-axis direction perpendicular to the optical axis (z-axis) direction of the actuator to which the lens assembly is coupled, a first signal preprocessor for amplifying (in an amplifier 104) an actuator movement distance sensing signal output from the Hall sensor 102, and then removing noise (in an RC filter), and then converting into actuator movement distance sensing data in a digital form (in an analog-to-digital converter (ADC) and an ADC interface (I/F)), and an interface (I2C I/F) 114 for transmitting the actuator movement distance sensing data to the OIS controller IC 300 in a two-wire interface method.

The Hall sensor 102, the first signal preprocessor, and the interface 114 may be packaged in a digital one-chip IC.

Further, in order to sense a temperature of the actuator in the camera module, each of the actuator movement sensing elements 100 and 200 for a camera module, which has the above-described configuration, may further include a temperature sensing sensor 116 for sensing an ambient temperature of the actuator, a second signal preprocessor for amplifying (in an amplifier 118) a temperature sensing signal output from the temperature sensing sensor 116 and then removing noise (in an RC filter), a multiplexer 108 for selectively outputting one of the actuator movement distance sensing signal from which noise is removed and the temperature sensing signal from which noise is removed to a digital conversion part (the ADC) of the first signal preprocessor according to a control period.

In this case, the Hall sensor 102, the first signal preprocessor (including the amplifier 104, the RC filter, and a driver 106), the interface 114, the temperature sensing sensor 116, the second signal preprocessor (including the amplifier 118, the RC filter, and a driver 120), the multiplexer 108, and digital conversion parts 110 and 112 may be packaged in a digital one-chip IC.

In some cases, the configuration of each of the above-described two examples may further include an actuator driver 123 for generating an actuator drive signal according to the actuator drive control data transmitted from the OIS controller IC 300 through the interface 114 and for outputting the actuator drive signal to the actuator. In this case, it is assumed that the interface 114 includes a driver interface 122 for interfacing with the actuator driver 123. As described above, the actuator driver 123 may also be packaged in a digital one-chip IC together with various components constituting the actuator movement sensing elements 100 and 200.

Figure 7:
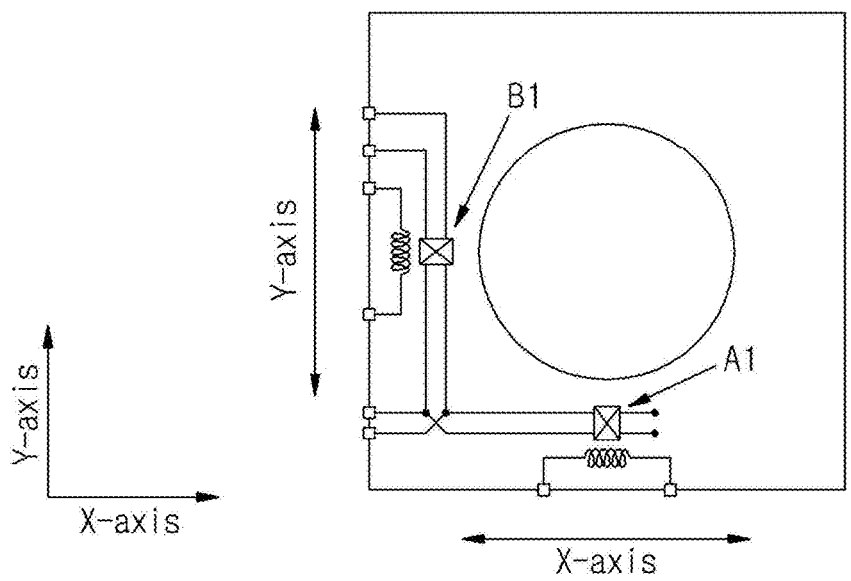
FIG. 7 is an exemplary diagram illustrating a circuit connection of a camera module according to the embodiment of the present invention.

Hereinafter, operations of the actuator movement sensing elements 100 and 200 according to the embodiment of the present invention will be further described with reference to FIGS. 5 and 7.

First, when the actuator to which the lens assembly is coupled moves in the x-axis and/or y-axis direction perpendicular to the optical axis (z-axis), each of the Hall sensors 102 sense a movement distance of the actuator in the x- or (and) y-axis direction and output the movement distance. Then, the actuator movement distance sensing signal is amplified by the amplifier 104, noise is removed in the RC filter, and the actuator movement distance sensing signal bypasses through the driver 106 and is applied to the multiplexer 108.

Meanwhile, when the temperature sensing sensor 116 is provided in the camera module, the temperature sensing sensor 116 senses and outputs an ambient temperature of the actuator, and a temperature sensing signal is also amplified by the amplifier 118, noise is removed by the RC filter, and then the temperature sensing signal bypasses through the driver 120 to be applied to the multiplexer 108.

Accordingly, the actuator movement distance sensing signal and the temperature sensing signal of different channels applied to the multiplexer 108 are transmitted to the interface 114, which transmits data in the two-wire interface method, according to a control period through the ADC 110 and the ADC I/F 112 which are the digital conversion parts.

Thus, the interface 114 transmits digitally converted actuator movement distance sensing data or digitally converted temperature sensing data to the OIS controller IC 300 as serial data according to a serial clock (SCL).

As shown in FIG. 3, the actuator movement distance sensing data or the temperature sensing data, which is transmitted to the OIS controller IC 300, is restored and transmitted to an OIS controller (not shown) located at a post-stage through an interface (I2C I/F) which receives data in the two-wire interface method. Thus, the OIS controller corrects hand shaking from the actuator movement distance sensing data on the actuator moving in the x-axis and y-axis directions and generates actuator drive control data required for shake correction to output the actuator drive control data to the actuator driver.

As shown in FIG. 6, when the actuator driver 123 is provided in each of the actuator movement sensing elements 100 and 200, the actuator drive control data may be transmitted to the actuator movement sensing elements 100 and 200 in the two-wire interface method and transmitted to the actuator driver 123 through the driver I/F 122. Thus, the actuator driver 123 generates an actuator drive signal according to the inputted actuator drive control data and outputs the actuator drive signal to the actuator driving coils MX and MY shown in FIG. 7 so that the actuator in the camera module drives in the x-axis and y-axis directions.

Meanwhile, the temperature sensing data transmitted to the OIS controller IC 300 is transmitted to a shake correction and auto-focusing control part so that the temperature sensing data is used to control so as to stably maintain shake correction performance and auto-focusing performance without performance degradation.

As described above, the actuator movement sensing element according to the embodiment of the present invention includes the Hall sensor 102 for sensing a movement distance of the actuator in the x-axis or y-axis direction perpendicular to the optical axis (z-axis) direction of the actuator to which the lens assembly is coupled, the first signal preprocessor for amplifying the actuator movement distance sensing signal which is output from the Hall sensor 102, removing noise, and converting into the actuator movement distance sensing data in a digital form, and the interface 114 for transmitting the actuator movement distance sensing data to the OIS controller IC 300 in the two-wire interface method. Therefore, as shown in FIG. 7, the camera module including the above-described actuator movement sensing element requires only a total of eight pins which include the four pins MX+, MX−, MY+, and MY− connected to the actuator driving coils MX and MY, the two two-wire interface pins SCL and SDA for data interfacing with the OIS controller IC 300, the one common power supply pin VDD, and the one common ground pin GND. Consequently, the number of pins may be reduced when the camera module is manufactured such that convenience in designing and manufacturing the FPCB may be provided.

For reference, when the two-wire interface method is employed as a method of minimizing the number of physical pins connecting the camera module to the OIS controller IC 300, a case may occur in which additional information is not completely transmitted due to data transmission rate limitation of the two-wire interface method when information (e.g., actuator position information or a temperature in the camera module) which should be additionally transmitted is increased.

Thus, the camera module actuator movement sensing element and the OIS controller IC 300 according to the embodiment of the present invention may transmit actuator position information (which is referred to as movement distance sensing data) and temperature information which are sensed by the camera module through the following data transmission method while satisfying a data transmission standard of the two-wire interface method.

For example, in a first transmission section in which each axial movement distance sensing data of the actuator should be transmitted to the OIS controller IC 300, the camera module actuator movement sensing element may transmit each axial movement distance sensing data sensed through the camera module actuator movement sensing element in the two-wire interface method without correction, and, in a transmission section next to the first transmission section, the camera module actuator movement sensing element may set only an increment between the previously transmitted axial movement distance sensing data and currently sensed axial movement distance sensing data in each axis direction as each axial movement distance sensing data and insert identification information for identifying an axial direction between transmission sections of the axial movement distance sensing data to transmit the identification information.

In this case, in the transmission section next to the first transmission section, only the increment between the previously transmitted axial movement distance sensing data and the currently sensed axial movement distance sensing data (i.e., movement distance sensing data which should be transmitted at a present time) is transmitted, and thus it is possible to secure a data section which should be additionally transmitted. As described above, the temperature information sensed in the camera module may be added and transmitted using the additionally secured data section, and axial direction identification information may be inserted between x-axis direction movement distance sensing data and y-axis direction movement distance sensing data and transmitted. More specifically, when a temperature sensing element is included in the camera module, temperature sensing data which is sensed through the temperature sensing element may be transmitted following each axial movement distance sensing data without correction in the above first operation, and only the increment with respect to the previously transmitted temperature sensing data may be transmitted following each axial movement distance sensing data in the above second operation.

When the data is transmitted and received between the camera module and the OIS controller IC 300 in the above method which is described above in detail, even though the two-wire interface method is employed, the data may be normally transmitted without loss of information which should be additionally transmitted.

While the present invention has been described with reference to the embodiments shown in the drawings, these embodiments are merely illustrative and it should be understood that various modifications and equivalent other embodiments can be derived by those skilled in the art to which the present invention pertains. For example, in the embodiment of the present invention, the sensing element for sensing the movement distance of the actuator in the x-axis or y-axis direction perpendicular to the optical axis (z-axis) direction of the actuator to which the lens assembly is coupled has been described, but the embodiments of the present invention may also be applied to a sensing element for sensing a movement distance of the actuator in the optical axis direction without any modification. Therefore, the true technical scope of the present invention should be defined by the appended claims.

What is claimed is:

1. A camera module actuator movement sensing element comprising:
    a Hall sensor configured to sense a movement distance of an actuator in an x-axis or y-axis direction perpendicular to an optical axis (z-axis) direction of the actuator to which a lens assembly is coupled;
    a first signal preprocessor configured to amplify an actuator movement distance sensing signal output from the Hall sensor, then remove noise, and then convert into actuator movement distance sensing data in a digital form;
    an interface configured to transmit the actuator movement distance sensing data to an optical image stabilization (OIS) controller, wherein the actuator movement distance sensing data is transmitted in a two-wire interface method;
    a temperature sensing sensor configured to sense an ambient temperature of the actuator;
    a second signal preprocessor configured to amplify a temperature sensing signal output from the temperature sensing sensor and then remove noise; and
    a multiplexer configured to selectively output one of the actuator movement distance sensing signal from which noise is removed or the temperature sensing signal from which noise is removed to a digital conversion part of the first signal preprocessor according to a control period.

2. The camera module actuator movement sensing element of claim 1, wherein the Hall sensor, the first signal preprocessor, the interface, the temperature sensing sensor, the second signal preprocessor, and the multiplexer are packaged in a one-chip integrated circuit (IC).

3. The camera module actuator movement sensing element of claim 1, further comprising:
    an actuator driver configured to generate an actuator drive signal according to actuator drive control data transmitted from the OIS controller through the interface and output the actuator drive signal to the actuator.

4. The camera module actuator movement sensing element of claim 3, wherein the actuator driver is packaged in a one-chip integrated circuit (IC) together with the Hall sensor, the first signal preprocessor, and the interface or packaged in a one-chip IC together with the Hall sensor, the first signal preprocessor, the interface, the temperature sensing sensor, the second signal preprocessor, and the multiplexer.

5. A camera module flexible circuit board comprising:
    a plurality of actuator movement sensing elements configured to sense movement distances of an actuator in x-axis and y-axis directions perpendicular to an optical axis (z-axis) direction of the actuator to which a lens assembly is coupled and transmit the sensed movement distances in a two-wire interface method; and
    an optical image stabilization (OIS) controller integrated circuit (IC) configured to correct hand shake by receiving feedback of the movement distances of the actuator from the plurality of actuator movement sensing elements in the two-wire interface method,
    wherein a serial data pin and a serial clock pin of each of the plurality of actuator movement sensing elements are shared to be connected to a serial data pin and a serial clock pin of the OIS controller IC, and a power pin and a ground pin of each of the plurality of actuator movement sensing elements are shared, or only either the power pin or the ground pin is shared,
    wherein each of the plurality of actuator movement sensing elements includes,
        a Hall sensor configured to sense the movement distance of the actuator in the x-axis or y-axis direction perpendicular to the optical axis (z-axis) direction of the actuator to which the lens assembly is coupled,
        a first signal preprocessor configured to amplify an actuator movement distance sensing signal output from the Hall sensor, then remove noise, and then convert into actuator movement distance sensing data in a digital form, and
        an interface configured to transmit the actuator movement distance sensing data to the OIS controller IC in a two-wire interface method, and
    wherein the camera module flexible circuit board further includes,
        a temperature sensing sensor configured to sense an ambient temperature of the actuator;
        a second signal preprocessor configured to amplify a temperature sensing signal output from the temperature sensing sensor and then remove noise; and
        a multiplexer configured to selectively output one of the actuator movement distance sensing signal from which noise is removed or the temperature sensing signal from which noise is removed to a digital conversion part of the first signal preprocessor according to a control period.

6. The camera module flexible circuit board of claim 5, wherein the Hall sensor, the first signal preprocessor, the interface, the temperature sensing sensor, the second signal preprocessor, and the multiplexer are packaged in a one-chip IC.

7. The camera module flexible circuit board of claim 5, further comprising:
   an actuator driver configured to generate an actuator drive signal according to actuator drive control data transmitted from the OIS controller IC through the interface and output the actuator drive signal to the actuator.

8. The camera module flexible circuit board of claim 7, wherein the actuator driver is packaged in a one-chip IC together with the Hall sensor, the first signal preprocessor, and the interface or packaged in a one-chip IC together with the Hall sensor, the first signal preprocessor, the interface, the temperature sensing sensor, the second signal preprocessor, and the multiplexer.

* * * * *